US011898740B2

(12) United States Patent
Grandadam

(10) Patent No.: US 11,898,740 B2
(45) Date of Patent: Feb. 13, 2024

(54) MULTI-PURPOSE FLASHLIGHT

(71) Applicant: Promier Products Inc., Peru, IL (US)

(72) Inventor: Cody Duane Grandadam, Peru, IL (US)

(73) Assignee: Promier Products Inc., Peru, IL (US)

( * ) Notice: Subject to any disclaimer, the term of this patent is extended or adjusted under 35 U.S.C. 154(b) by 0 days.

(21) Appl. No.: 17/959,590

(22) Filed: Oct. 4, 2022

(65) Prior Publication Data

US 2023/0105563 A1 Apr. 6, 2023

Related U.S. Application Data

(60) Provisional application No. 63/251,766, filed on Oct. 4, 2021.

(51) Int. Cl.

| | |
|---|---|
| ***F21V 33/00*** | (2006.01) |
| ***F23Q 2/32*** | (2006.01) |
| ***F21L 4/02*** | (2006.01) |
| ***A62B 3/00*** | (2006.01) |
| ***B25F 1/04*** | (2006.01) |
| ***B25F 1/00*** | (2006.01) |
| ***B25F 1/02*** | (2006.01) |
| ***B26B 11/00*** | (2006.01) |

(52) U.S. Cl.
CPC .......... *F21V 33/0084* (2013.01); *A62B 3/005* (2013.01); *F21L 4/022* (2013.01); *F23Q 2/32* (2013.01); *A62B 3/00* (2013.01); *B25F 1/00* (2013.01); *B25F 1/003* (2013.01); *B25F 1/006* (2013.01); *B25F 1/02* (2013.01); *B25F 1/04* (2013.01); *B26B 11/008* (2013.01)

(58) Field of Classification Search
CPC .. A62B 3/00; A62B 3/005; F23Q 2/32; B26B 11/008; B25F 1/00–04; F21V 33/0084
See application file for complete search history.

(56) References Cited

U.S. PATENT DOCUMENTS 5,611,615 A * 3/1997 Jang .......................... A63B 29/08 362/208
9,958,150 B1 * 5/2018 Tang .................... F21V 23/0414
(Continued)

FOREIGN PATENT DOCUMENTS

CN 202563631 U * 11/2012
CN 112618976 A * 4/2021 ............... A62B 3/00

OTHER PUBLICATIONS

Machine translation of CN 112618976 A retrieved from the FIT database of PE2E search. (Year: 2023).*
(Continued)

*Primary Examiner* — Colin J Cattanach
(74) *Attorney, Agent, or Firm* — Barnes & Thornburg LLP

(57) ABSTRACT

A multi-purpose flashlight having a plurality of internal and external accessories that are designed to allow the user to perform a variety of activities which increases the utility of the flashlight. Said multi-purpose flashlight includes a handle assembly and main body assembly. The handle assembly of the flashlight includes a cutting and opening assembly, a magnetic attachment means, and a bit attachment means. Meanwhile, the main body assembly including a lighter assembly, a lighting assembly, and a removable cap including a glass-breaker, the removable cap being configured to removably enclose the lighter assembly.

14 Claims, 21 Drawing Sheets

(56) References Cited

U.S. PATENT DOCUMENTS

| | | | | |
|---|---|---|---|---|
| 2006/0262518 | A1* | 11/2006 | Thuma | B25F 1/04 362/120 |
| 2008/0316737 | A1* | 12/2008 | Summers | F41B 15/022 463/47.7 |
| 2011/0072594 | A1* | 3/2011 | Danias-Borkin | B67B 7/44 7/155 |

OTHER PUBLICATIONS

Machine translation of CN 202563631 U retrieved from the FIT database of PE2E search. (Year: 2023).*

* cited by examiner

MULTI-PURPOSE FLASHLIGHT

TECHNICAL FIELD

This disclosure relates to a flashlight and, more particularly, to a multi-purpose flashlight having a plurality of internal and external accessories that are designed to allow the user to perform a variety of activities which increases the utility of the flashlight.

BACKGROUND

Portable light products are critical for outdoor, low-light (e.g. pre-dawn or dusk) and/or nighttime activities. Portable light products such as flashlights typically do not include accessories that are useful to have when a person is traveling within a vehicle. This requires people to carry separate tools that are costly, require additional storage space, and may get lost. For example, while boating, a person may need a line cutter or a bottle opener in addition to the flashlight. In another example, if a person is in a car accident, they may need a seatbelt cutter and a window-breaking device. Accordingly, there is an unmet need for a portable flashlight that includes various accessories, while having a form factor that is easy to carry and store without taking up excess space while participating in a variety of activities.

The description provided in the background section should not be assumed to be prior art merely because it is mentioned in or associated with the background section. The background section may include information that describes one or more aspects of the subject technology.

SUMMARY OF THE INVENTION

The multi-purpose flashlight includes internal accessories, concealed within the housing of the flashlight, and external accessories, positioned external to the housing of the flashlight. The internal accessories may include a knife, lighter assembly, and/or bits (e.g., Philips screw driver bit, flat head screw driver bit, or any other bit), and are configured to be either coupled to an exterior extent of the flashlight or exposed during use of said internal accessory. The external accessories may include an attachment mechanism, magnetic attachment means, a cutting mechanism, beverage opener, bit attachment means, window-breaker, can opener, saw, and/or hex wrenchs. Said internal and external accessories may be useful to have within a vehicle (e.g., boat, recreational vehicle, truck, van or car). Accordingly, the flashlight 10 provides the user with multiple mounting configurations (e.g., hand-held, hanging via the attachment mechanism, magnetically coupled to a support surface, or temporarily resting on or against a support surface), multiple illumination states (e.g., “On”, “Off”, or “Flashing”), and has a number of accessories (e.g., cutting mechanism, beverage opener, knife, bit attachment means, lighter, can opener, saw, hex wrench, and/or window-breaker).

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
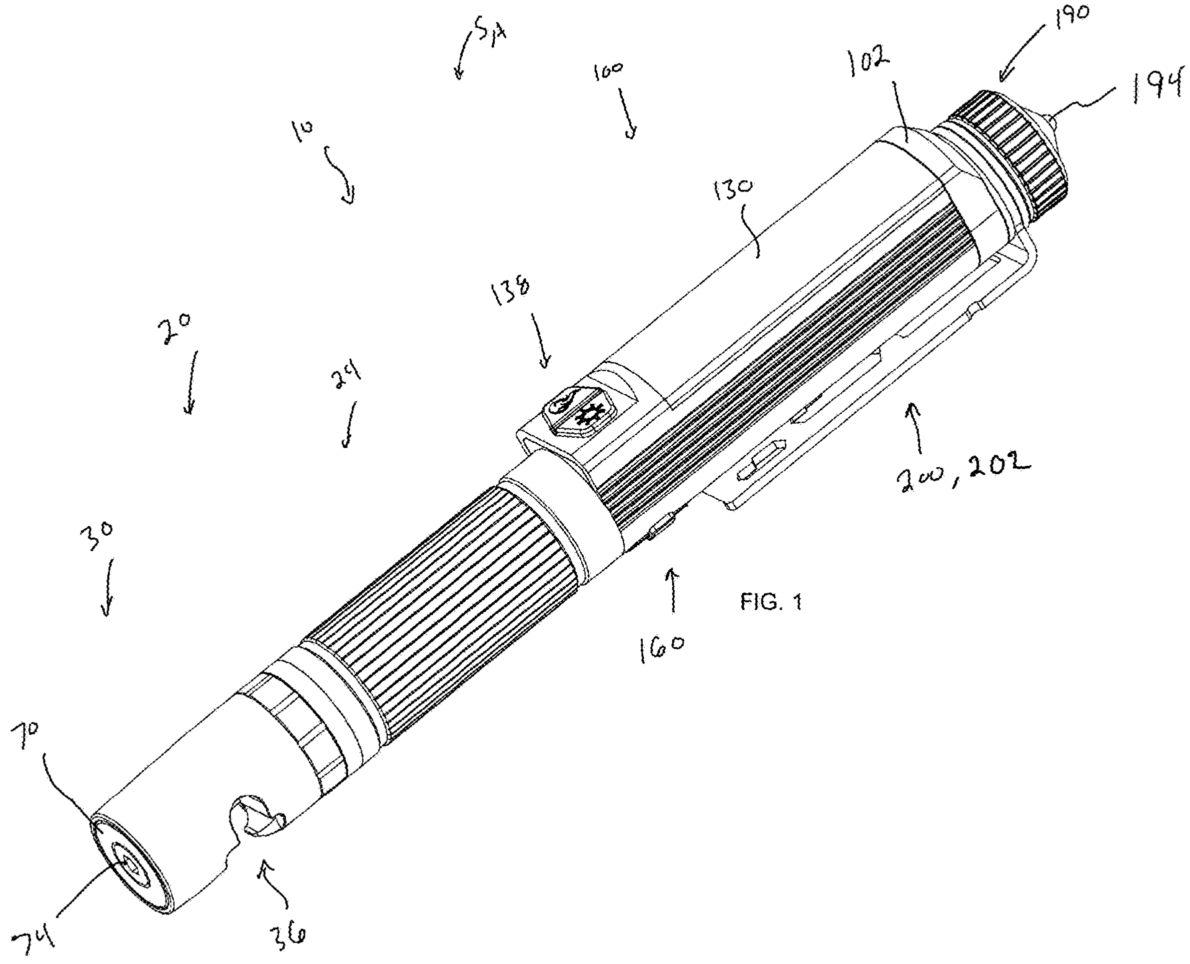
FIG. 1 is a first perspective view of a flashlight according to a first exemplary embodiment.
Figure 2:
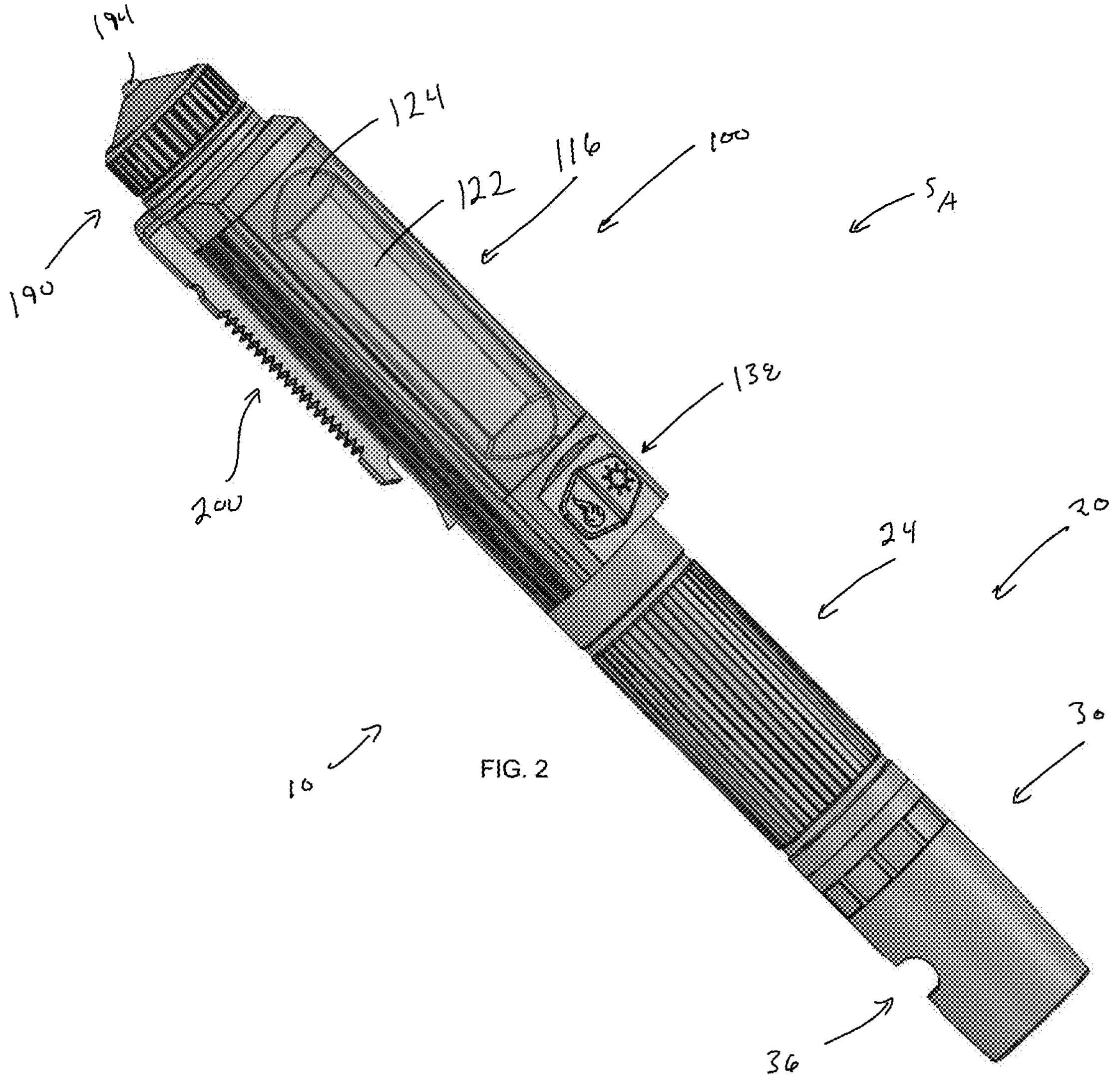
FIG. 2 is a second perspective view of the flashlight of FIG. 1.
Figure 3:
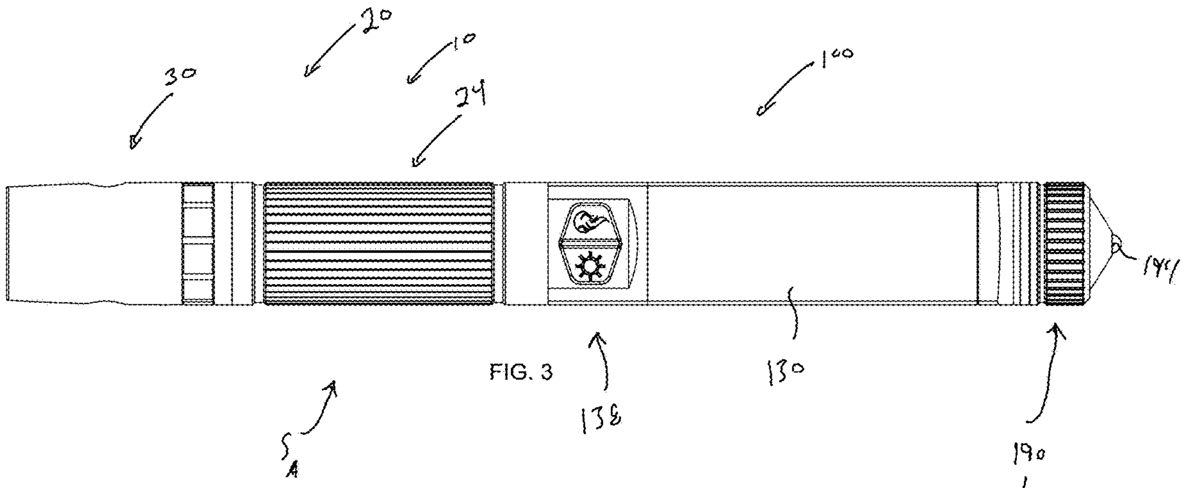
FIG. 3 is a first front view of the flashlight of FIG. 1.
Figure 4:
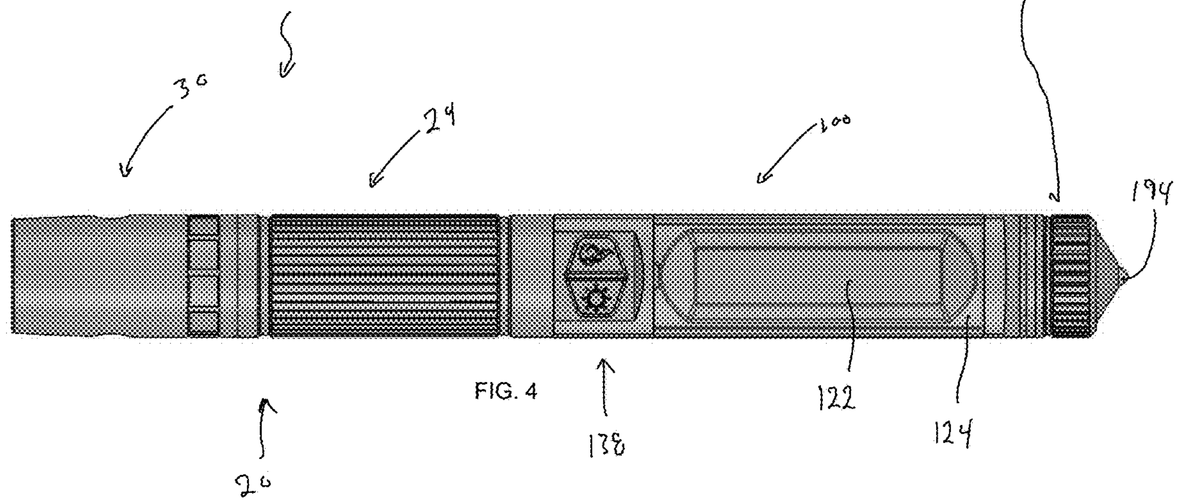
FIG. 4 is a second front view of the flashlight of FIG. 1.
Figure 5:
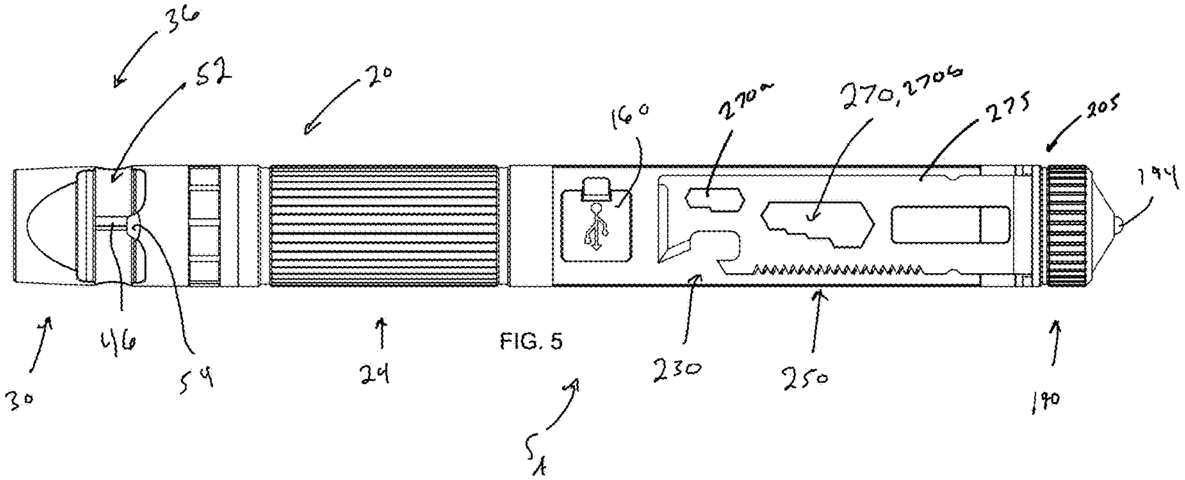
FIG. 5 is a first rear view of the flashlight of FIG. 1.
Figure 6:
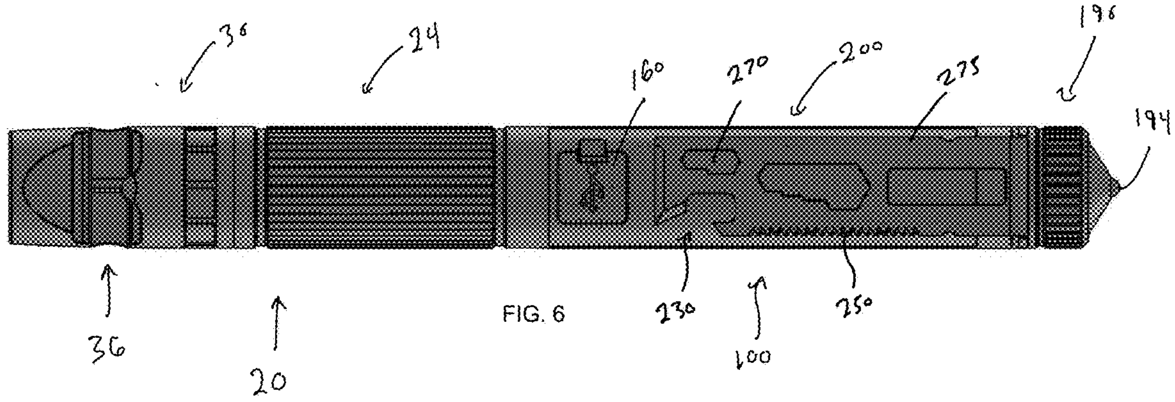
FIG. 6 is a second rear view of the flashlight of FIG. 1.
Figure 7:
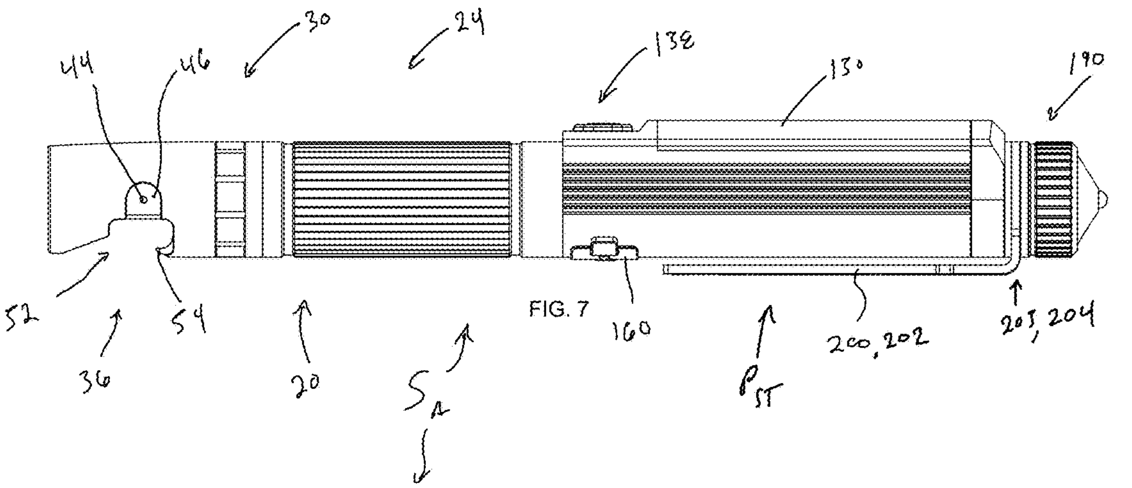
FIG. 7 is a first right side view of the flashlight of FIG. 1.
Figure 8:
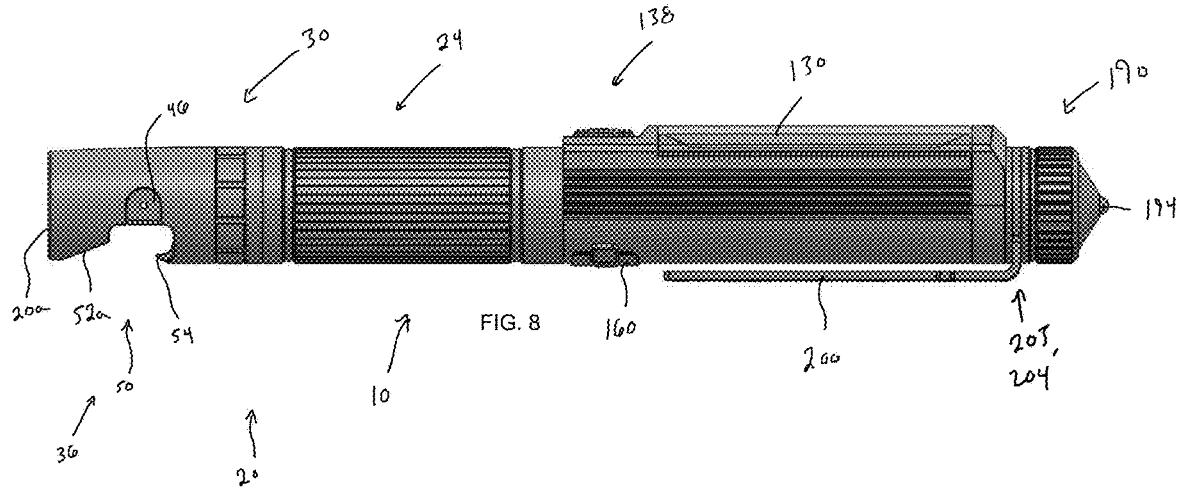
FIG. 8 is a second right side view of the flashlight of FIG. 1.
Figure 9:
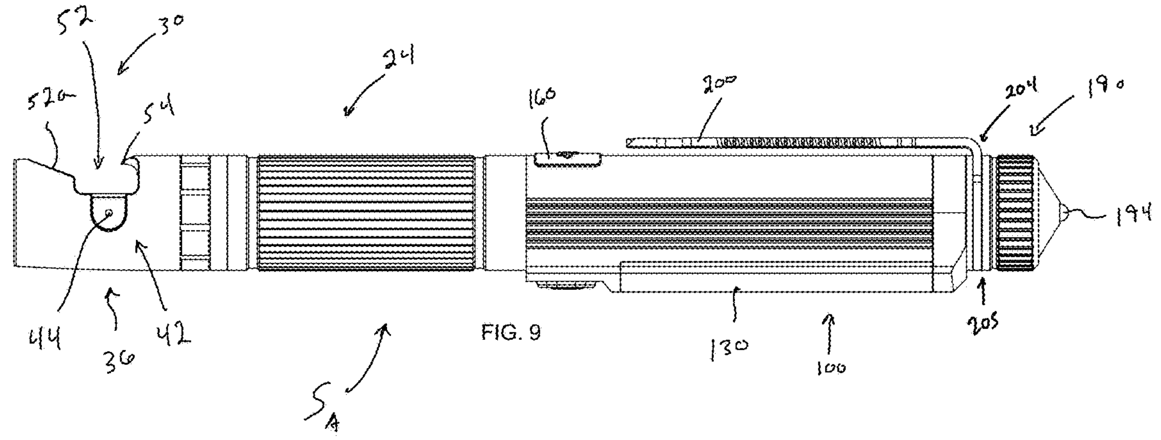
FIG. 9 is a first left side view of the flashlight of FIG. 1.
Figure 10:
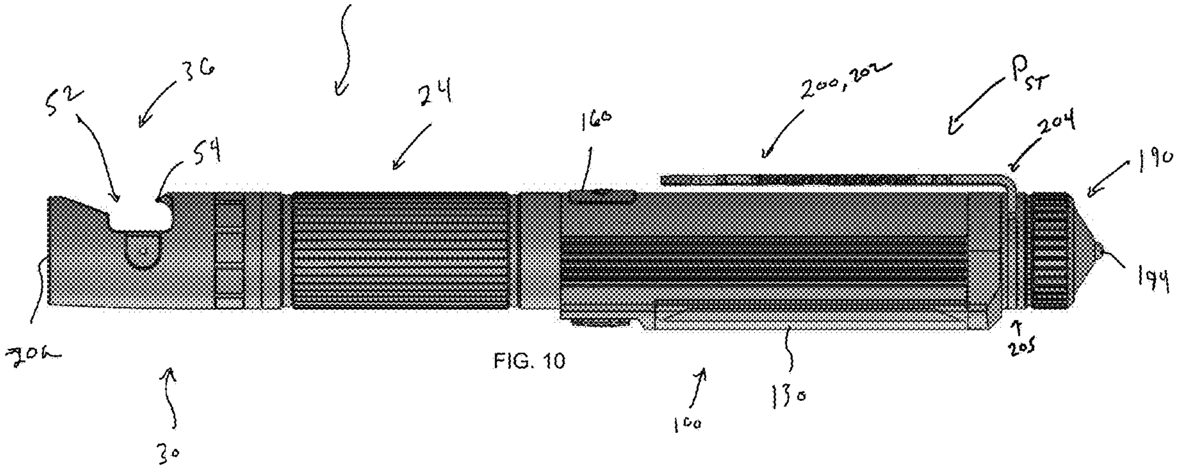
FIG. 10 is a first left side view of the flashlight of FIG. 1.
Figure 11:
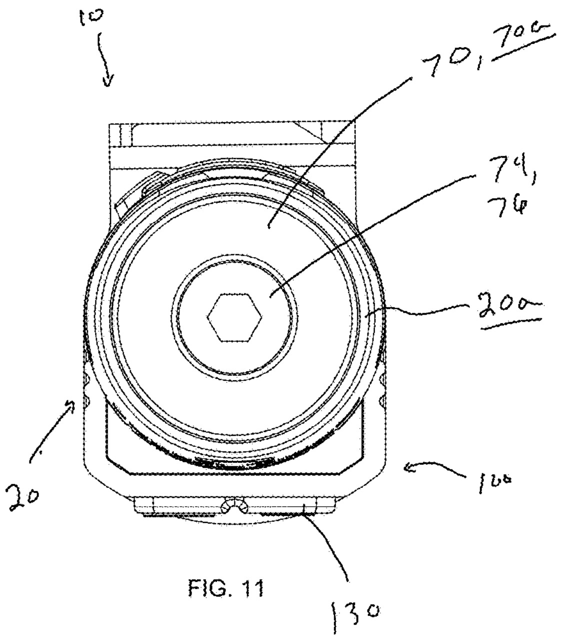
FIG. 11 is a first bottom view of the flashlight of FIG. 1.
Figure 12:
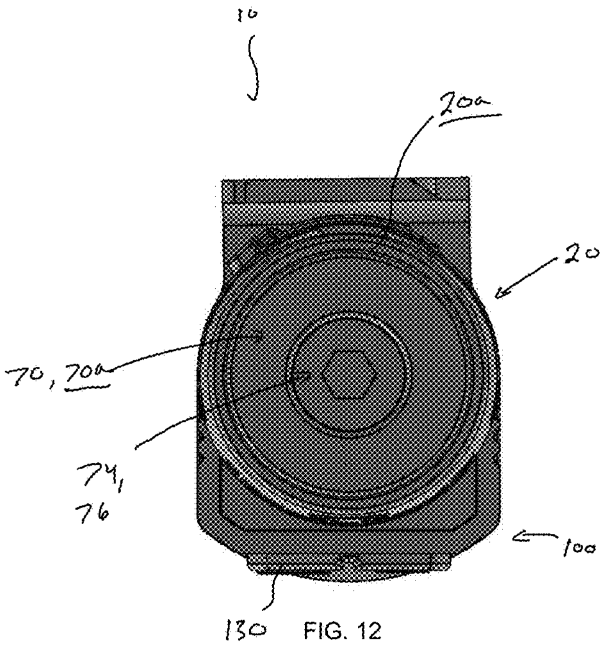
FIG. 12 is a second bottom view of the flashlight of FIG. 1.
Figure 13:
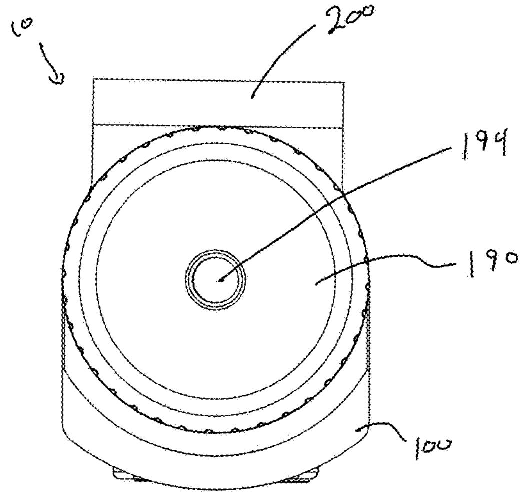
FIG. 13 is a first top view of the flashlight of FIG. 1.
Figure 14:
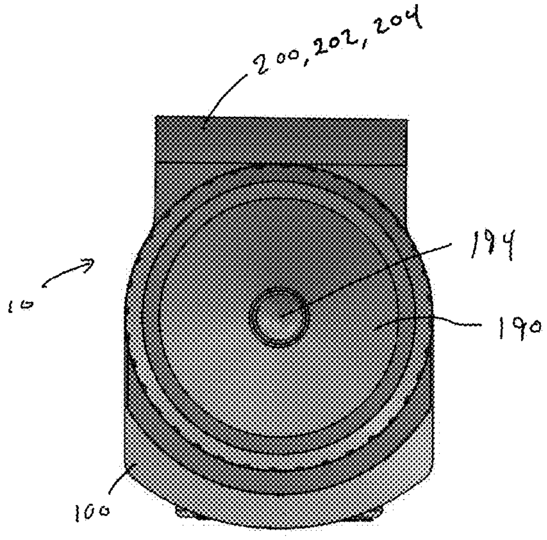
FIG. 14 is a second top view of the flashlight of FIG. 1.
Figure 15:
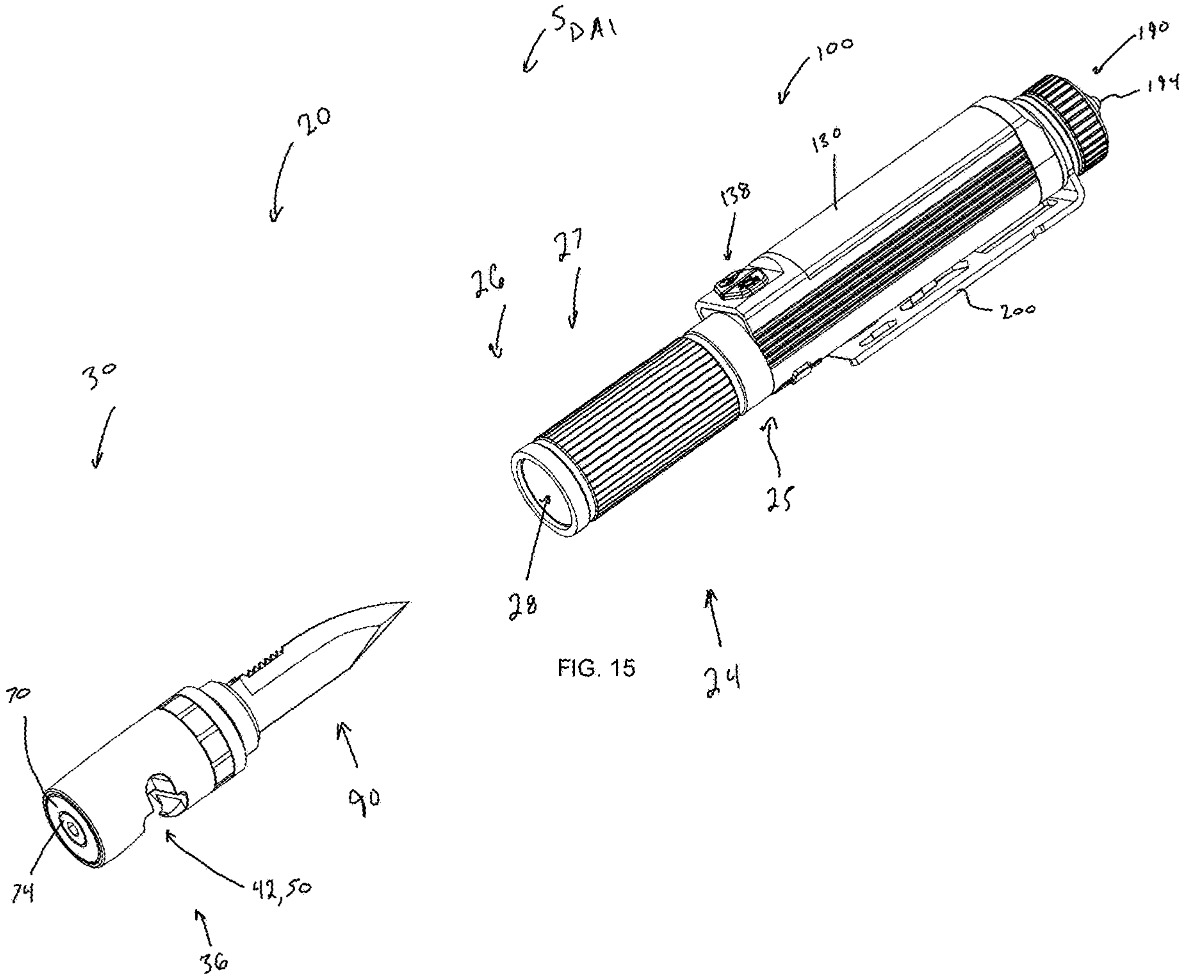
FIG. 15 is a first perspective view of the flashlight of FIG. 1, wherein a bottom portion of the flashlight has been removed from a handle portion of the flashlight to define a first disassembled state ($S_{DA1}$)
Figure 16:
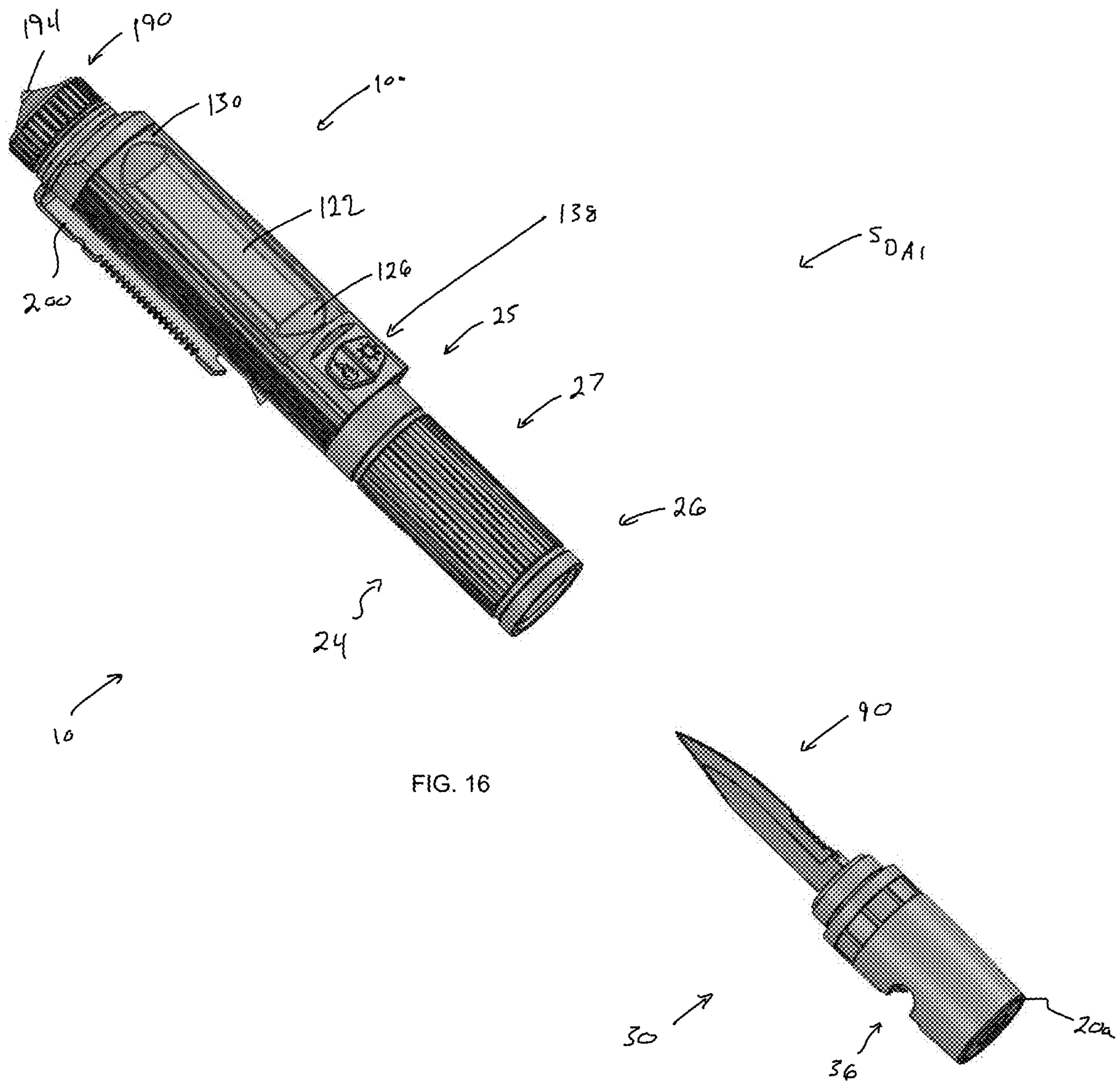
FIG. 16 is a second perspective view of the flashlight of FIG. 1 in the first disassembled state ($S_{DA1}$)
Figure 17:
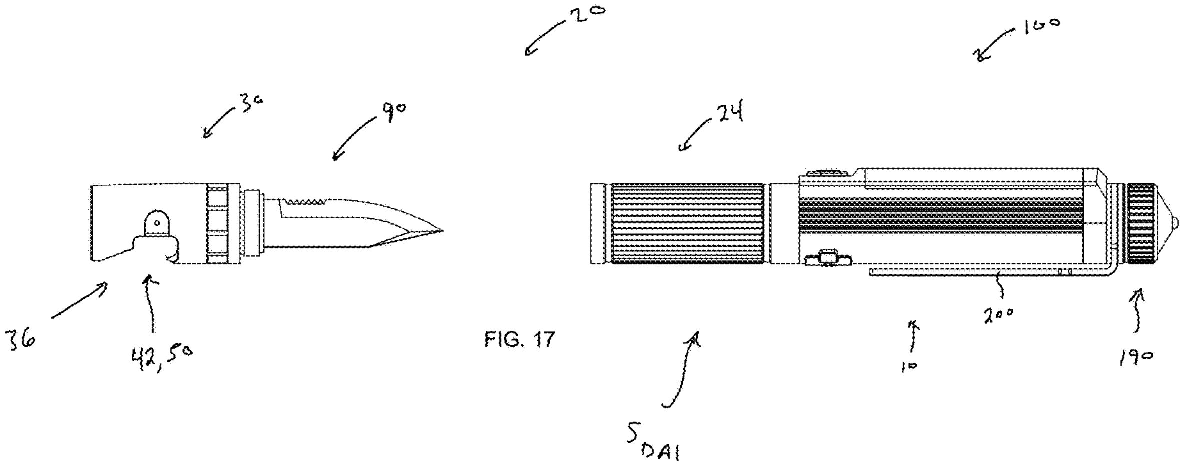
FIG. 17 is a first right side view of the flashlight of FIG. 1 in the first disassembled state ($S_{DA1}$)
Figure 18:
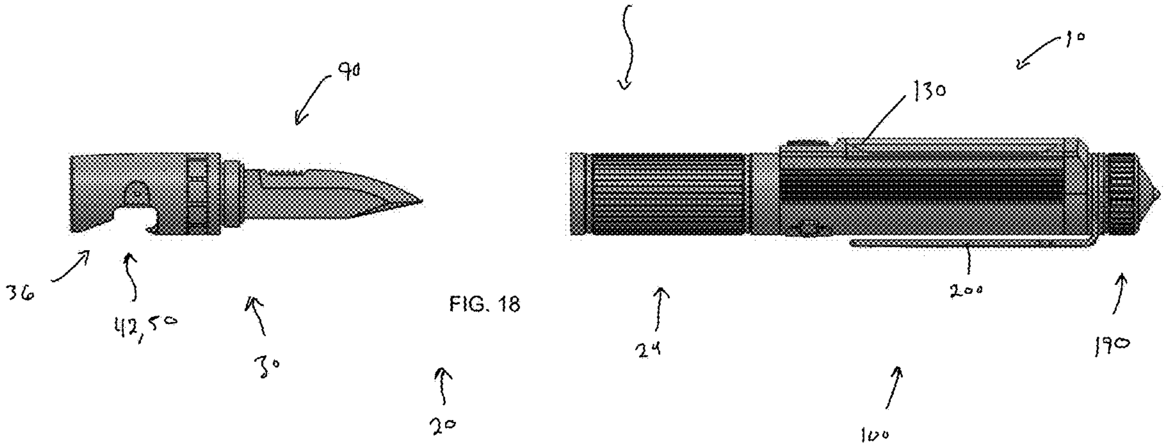
FIG. 18 is a second right side view of the flashlight of FIG. 1 in the first disassembled state ($S_{DA1}$)
Figure 19:
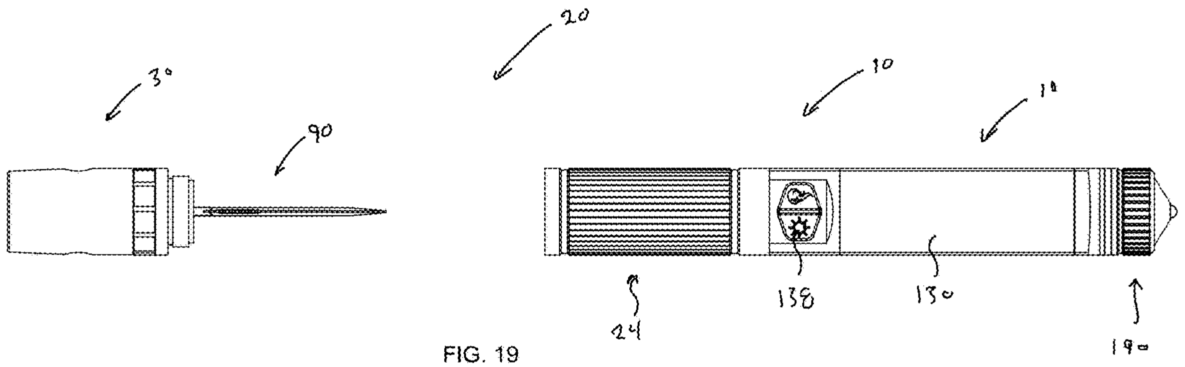
FIG. 19 is a first front view of the flashlight of FIG. 1 in the first disassembled state ($S_{DA1}$)
Figure 20:
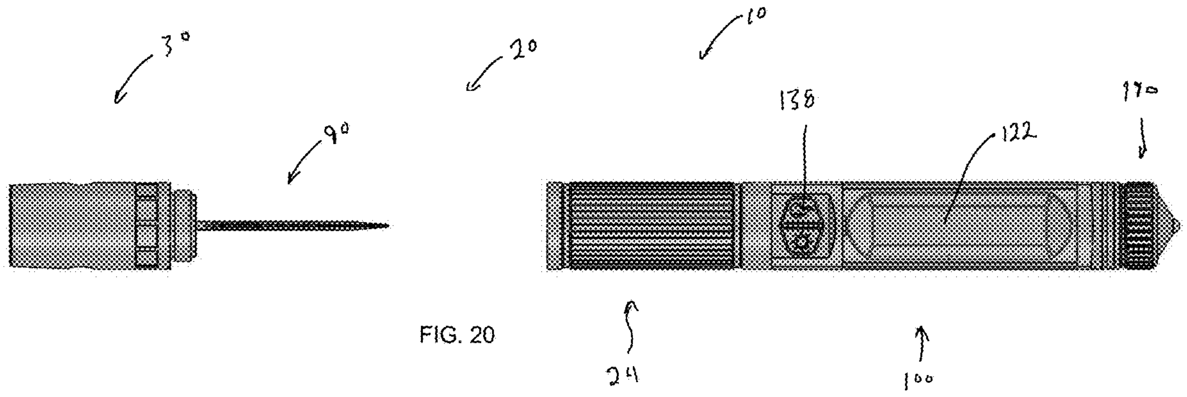
FIG. 20 is a second front view of the flashlight of FIG. 1 in the first disassembled state ($S_{DA1}$)
Figure 21:
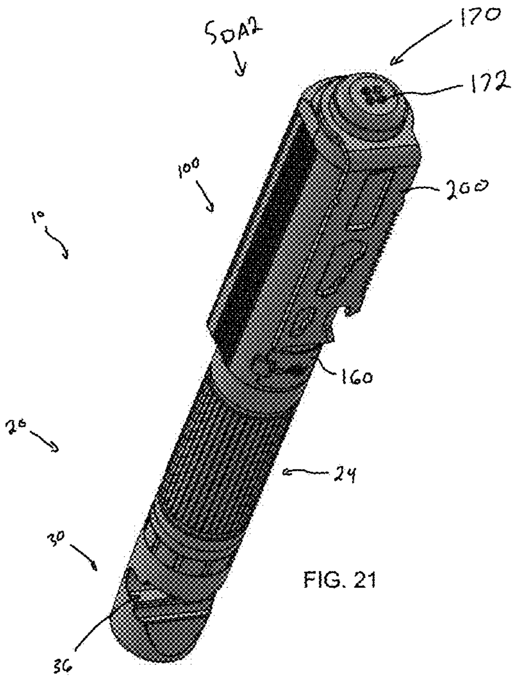
FIG. 21 is a rear perspective view of the flashlight of FIG. 1, wherein a cap has been removed from the main body of the flashlight to define form a second disassembled state ($S_{DA2}$)
Figure 22:
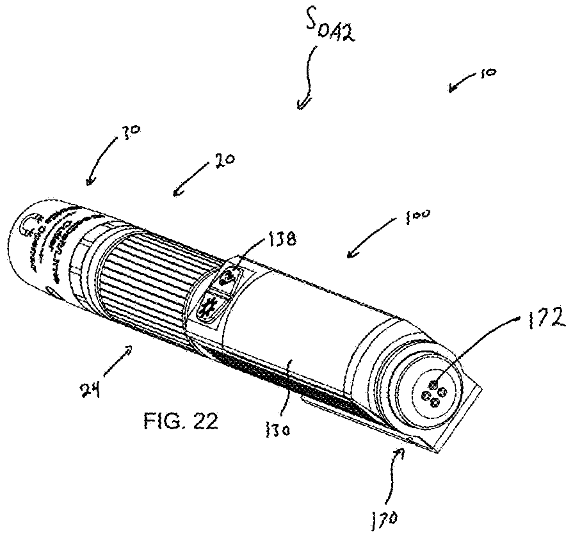
FIG. 22 is an end perspective view of the flashlight of FIG. 1 in the second disassembled state ($S_{DA2}$)
Figure 23:
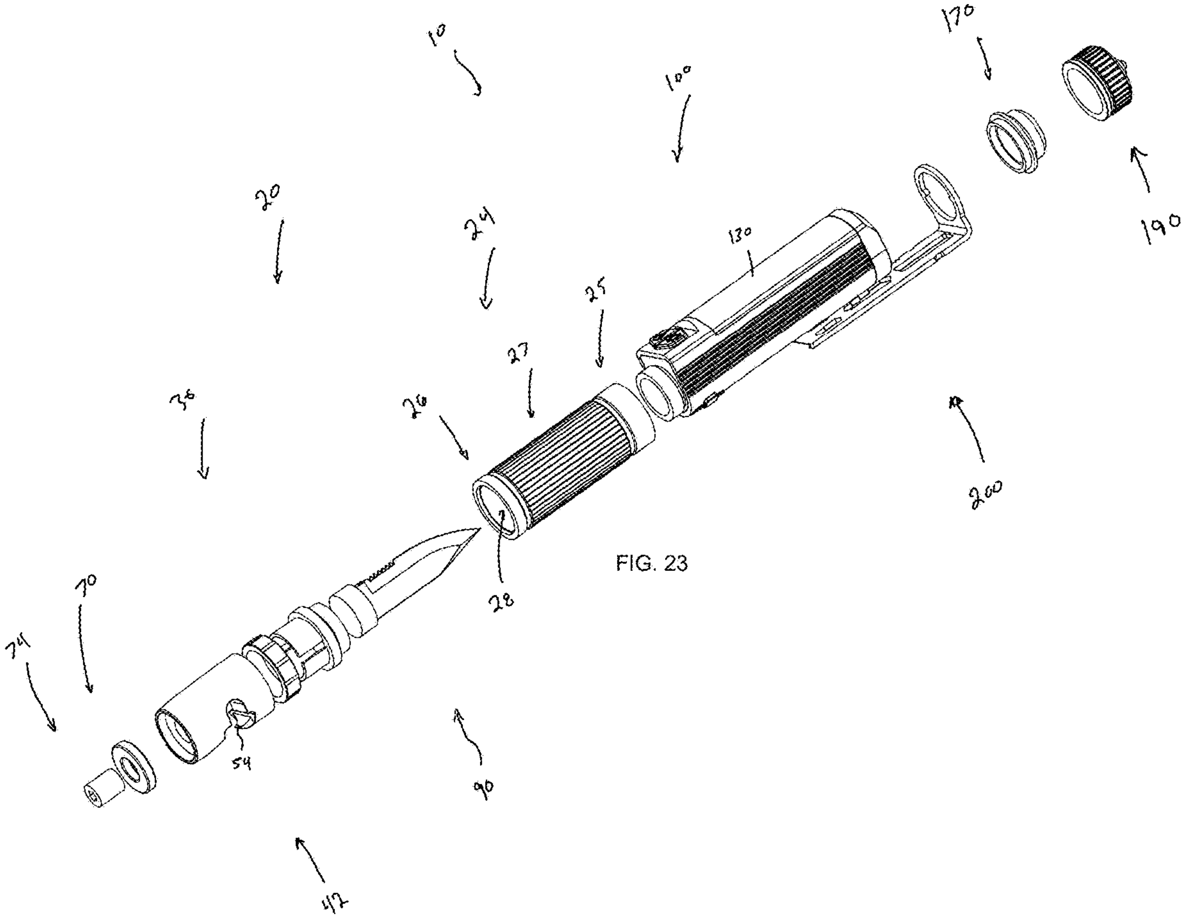
FIG. 23 is an exploded view of the flashlight of FIG. 1.
Figure 24:
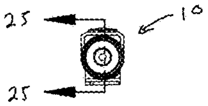
FIG. 24 is a bottom view of the flashlight of FIG. 1.
Figure 25:
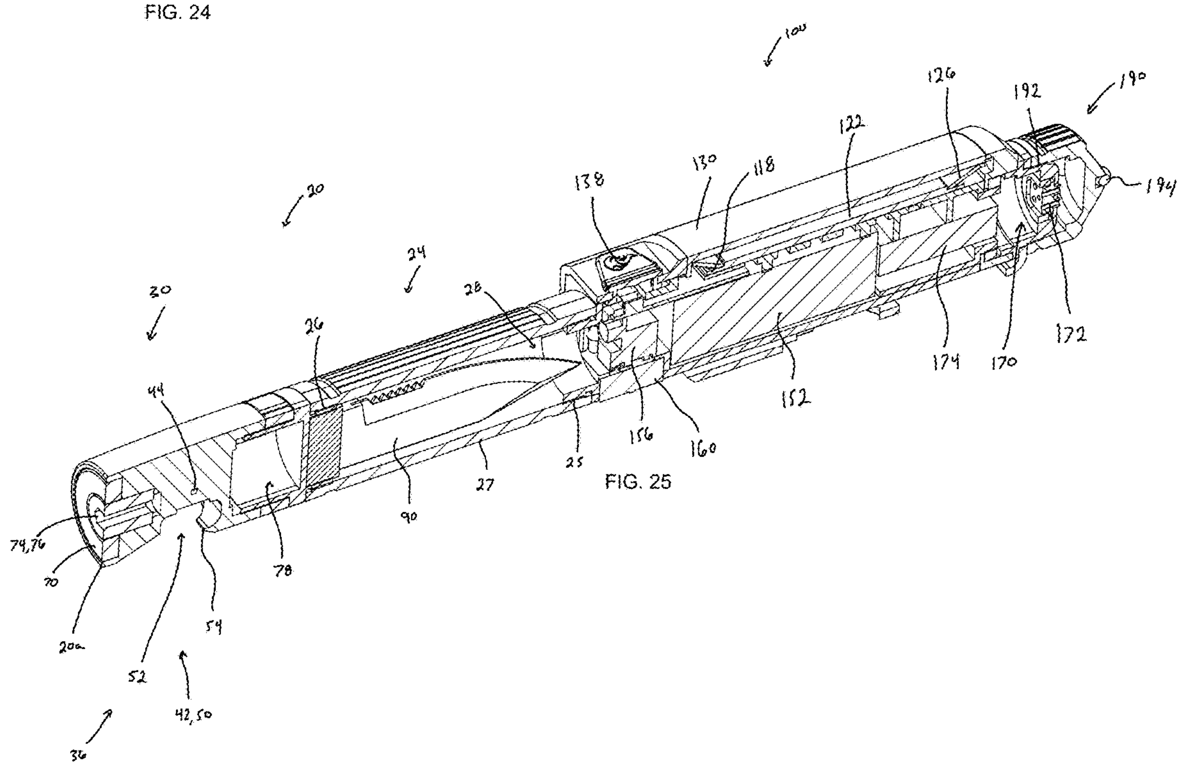
FIG. 25 is a cross-sectional view of the flashlight taken along line 25-25 of FIG. 24.
Figure 26:
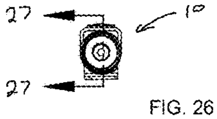
FIG. 26 is a bottom view of the flashlight of FIG. 1.
Figure 27:
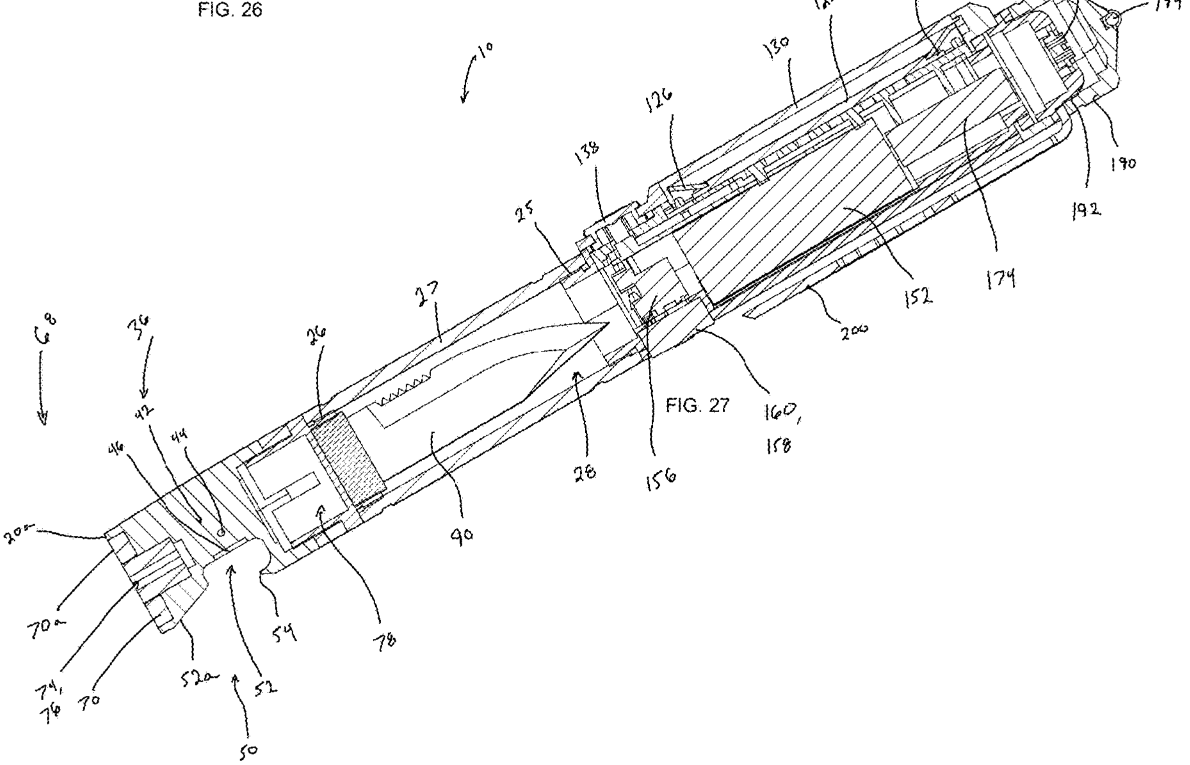
FIG. 27 is a cross-sectional view of the flashlight taken along line 27-27 of FIG. 26.
Figure 28:
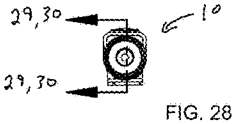
FIG. 28 is a bottom view of the main body of the flashlight of FIG. 1.
Figure 29:
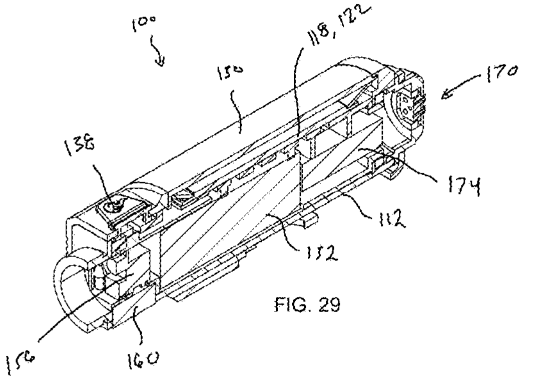
FIG. 29 is a cross-sectional view of the main body of the flashlight taken along line 29-29 of FIG. 28.
Figure 30:
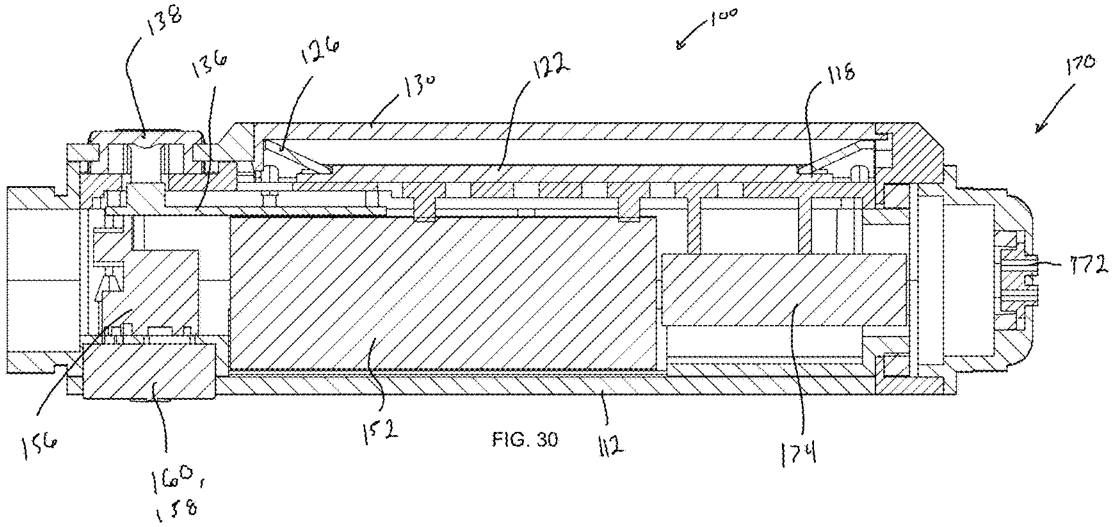
FIG. 30 is a cross-sectional view of the main body of the flashlight taken along line 30-30 of FIG. 28.

While this disclosure includes a number of details and embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated.

FIGS. 1-36 show two different embodiments of a multi-purpose flashlight 10 with internal and external accessories, where the flashlight 10 provides flexible illumination solutions in both stationary and portable situations. As an example of the external accessory, a user can releasably secure the flashlight 10 to a support structure, such as a pocket on the user's clothing, using the attachment mechanism 200 of the flashlight 10. The user can subsequently detach the flashlight 10 from the support structure (e.g., the user's pocket) and bring the flashlight 10, while illuminated or off, to another or second location that is distant from the first location to allow for portable illumination at that second location. In the second location, the flashlight 10 can be coupled to a ferromagnetic material 4 or temporarily resting on a support surface 2. The flashlight 10 also includes other accessories, which include: (i) cutting mechanism 42, (ii) beverage opener 50, (iii) internal knife 90, (iv) bit attachment means 74, (v) lighter assembly 170, (vi) window-breaker 194, (vii) can opener 230, (viii) saw 250, and/or (ix) hex wrenchs 270. Each of these accessories may be useful to have within a vehicle (e.g., boat, recreational vehicle, truck, van or car). Accordingly, the flashlight 10 provides the user with multiple mounting configurations (e.g., hand-held, hanging via the attachment mechanism, magnetically coupled to a support surface, or temporarily resting on or against a support surface), multiple illumination states (e.g., "On", "Off", or "Flashing"), and has a number of accessories (e.g., cutting mechanism, beverage opener, knife, bit attachment means, lighter, can opener, saw, hex wrench, and/or window-breaker).

The multi-purpose flashlight 10 includes: (i) a handle assembly 20, (ii) a main body assembly 100, (iii) a cap 190, and (iv) an attachment mechanism 200. The handle assembly 20 is coupled to the main body assembly 100 and is configured to provide an extent of the flashlight 10 for the user to hold while they move the flashlight 10 from the first location to the second location. The main body assembly 100 is configured to contain a majority, if not all, of the electronic components of the flashlight 10. Finally, the cap 190 is configured to: (i) enclose an extent of the lighter assembly 170, and (ii) be releasably attached to the main body 100. Finally, the attachment mechanism 200 is releasably coupled to the main body assembly 100 and designed to allow the user to engage the flashlight 10 with a support structure such that it can hang or depend from the support structure.

The handle assembly 20 of the multi-purpose flashlight 10 includes: (i) a top portion 24, and (ii) a bottom portion 30. The top portion 24 includes a top coupling means 25 that couples the top portion 24 to the main body assembly 100. The top coupling means 25 may be removably or non-removably attached to the top portion 24 of the handle 20 to the main body 100. As such, the top coupling means 25 may use any type of coupling means, including press-fit, threaded projections, bayonet style, a pin and socket, and/or a quarter-turn. Alternatively, the top portion 24 and an extent of the main body assembly 100 may be integrally formed (e.g., injection molding) as a single structure.

As shown in FIGS. 15-16, 23, 25, and 27, the top portion 24 of the handle assembly 20 has an outer wall 27 that forms an internal compartment 28. Said internal compartment 28 is configured to receive the knife 90, when the flashlight 10 is an assembled state ($S_A$). In other words, when the flashlight 10 is in the assembled state ($S_A$), the knife 90 is concealed or fully surrounded by the outer wall 27. The positional relationship of the knife 90 and the top portion 24 of the handle assembly 20 helps protect the user or others from accidently injuring themselves when the knife 90 is not in use. The top portion 24 of the handle assembly 20 also includes a bottom coupling means 26 that removably couples the top portion 24 of the handle assembly 20 to the bottom portion 30 of the handle assembly 20. Removably coupling these structures allows the user to remove the knife 90 form the internal compartment 28. To accomplish the removable coupling of these structures, the bottom coupling means 26 may be threaded projections, a bayonet style coupler, a pin and socket coupler, and/or a quarter-turn projection and receiver.

The bottom portion 30 of the handle assembly 20 includes: (i) cutting and opening assembly 36, (ii) a magnetic attachment means 70, and (iii) a bit attachment means 74. The cutting and opening assembly 42 is comprised of a cutting assembly 42 and a beverage opener 50. The beverage opener 50 is defined by a recess 52 that has an irregular periphery 52*a*. The irregular periphery 52*a* is configured to allow a user to place a protrusion 54 of the flashlight 10 under a first extent of a bottle cap when a second extent of a bottle cap is placed within the recess 52. Once the protrusion 54 is placed under the bottle cap, a user can apply an upwardly-directed force on the flashlight 10. This upwardly directed force causes the protrusion 54 of the flashlight 10 to apply a prying force on the first extent of the bottle cap that is directed upwardly and away from the bottle, which in turn allows for the removal of the bottle cap from the upper lip of the bottle. It should be understood that in other embodiments, the beverage opener 50 may be omitted or positioned in a different location (e.g., top portion 24 or main body 100).

The cutting assembly 42 is positioned within an extent of the recess 52 of the cutting assembly 42 and has an elongated fastener 44 that couples a sharpened edge or a blade 46 to the bottom portion 30 of the handle 20. The blade is configured such that it can cut a seatbelt, fishing line, or other similar thin structure when a user places the blade 84 in contact with the structure and moves the blade 46 back and forth. Once the blade 46 becomes dull, a user can replace the blade 46 by: (i) unscrewing the elongated coupler 44 from the bottom portion 30, (ii) removing the blade 46, (iii) placing a replacement blade 46, and (iv) screwing the elongated coupler 44 to the bottom portion 30. It should be understood that in other embodiments, the cutting assembly 42 and beverage opener 50 may be omitted or positioned in a different location (e.g., top portion 24, main body 100, or etc.).

The magnetic attachment means 70 is positioned within a lower extent 68 of the bottom portion 30 of the handle assembly 20. In fact, the lower most surface 70*a* of the magnetic attachment means 70 is positioned substantially flush with a lower edge 20*a* of the handle assembly 20. This allows the flashlight 20 to be placed on a support surface 2 without having the magnetic attachment means 70 interfere with the balance of the flashlight 10. Additionally, this positional relationship places the magnetic attachment means 70 in direct contact with a ferromagnetic material 4, which allows the design to utilize a weaker magnetic attachment means 70 in the design of the flashlight 10. The magnetic attachment means 70 that is shown within the figures is a cylindrical or tubular magnet 71. However, in other embodiments, a simple disk magnet may be utilized. It should be understood that in other embodiments, the magnetic attachment means 70 may be omitted or positioned in a different location (e.g., within an extent of the outer wall 27 or within an extent of the main body 100). A cylindrical or tubular magnet 71 is utilized because said magnetic attachment means 70 is configured to receives an extent of the bit attachment means 74. In particular, the bit attachment mean 74 is centered within the magnet 71. The bit attachment means 74 is shown as a hex shaped receptacle 76 that is designed to receive an extent of a bit (e.g., Philips screw driver bit, flat head screw driver bit, or any other bit). While not shown, bits may be stored within a storage compartment 78 that is positioned between the knife 90 and the recess 52. It should be understood that in other embodiments, the bit attachment means 74 may be omitted or positioned in a different location (e.g., top portion 24, main body 100, or within the internal compartment 28).

The knife 90 is coupled (e.g., releasably or non-releasably) to the bottom portion of the handle assembly 30 and configured to reside within the internal compartment 28. If the knife 90 is releasably coupled to the handle assembly 20, then the knife 90 may be replaced when it is dull, can be removed when a person is traveling somewhere they are not allowed to have a knife (e.g., airplane), or can be removed to make sharpening of the knife 90 easier. The knife 90 may have a serrated edge, a straight edge, or a combination of a serrated edge and straight edge. It should be understood that in other embodiments, the knife 90 may be omitted or positioned in a different location (e.g., main body 100). In an alternative embodiment, the knife 90 may also be deployed on a pivoting axis instead of being removed axially from the knife receiver 28. In a further alternative embodiment, upon actuation of a button, the knife 90 may move axially within the flashlight 10 and extend through the lower edge **20*a* of the handle assembly 20**.

It should be understood that some of the above structures/components may be omitted or additional structures/components may be added to the handle assembly 20. For example, retractable stand may be added to the base, a retractable hook or loop, or other ways of attaching this to a support surface may be added. Additionally, the bit attachment means 74 may be omitted and the size of the magnetic attachment means 70 may be increased. The cutting and opening assembly 36 may be omitted and the storage compartment 78 may be increased. Additionally, other similar combinations that are obvious to one of skill in the art are within the scope of this disclosure.

Figure 31:
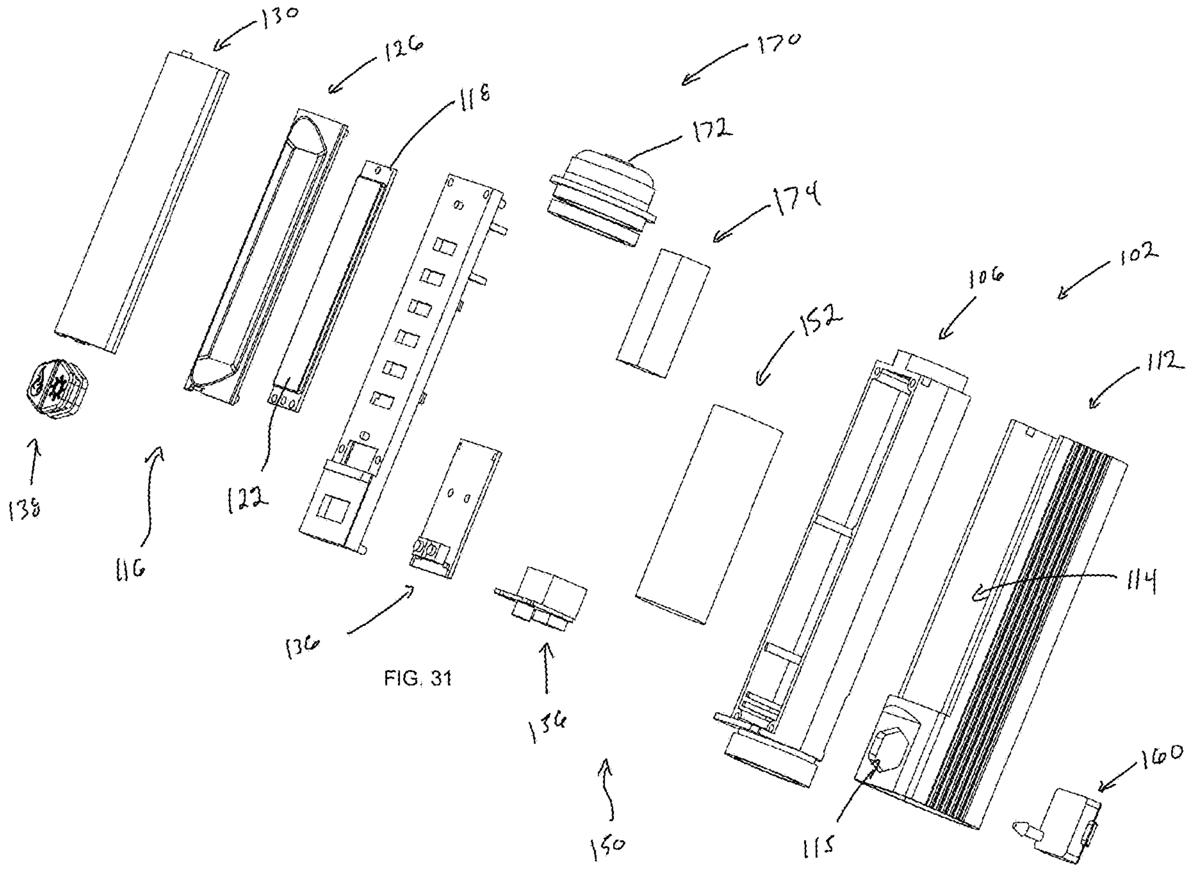
FIG. 31 is an exploded view of the main body of the flashlight of FIG. 1.
Figure 32:
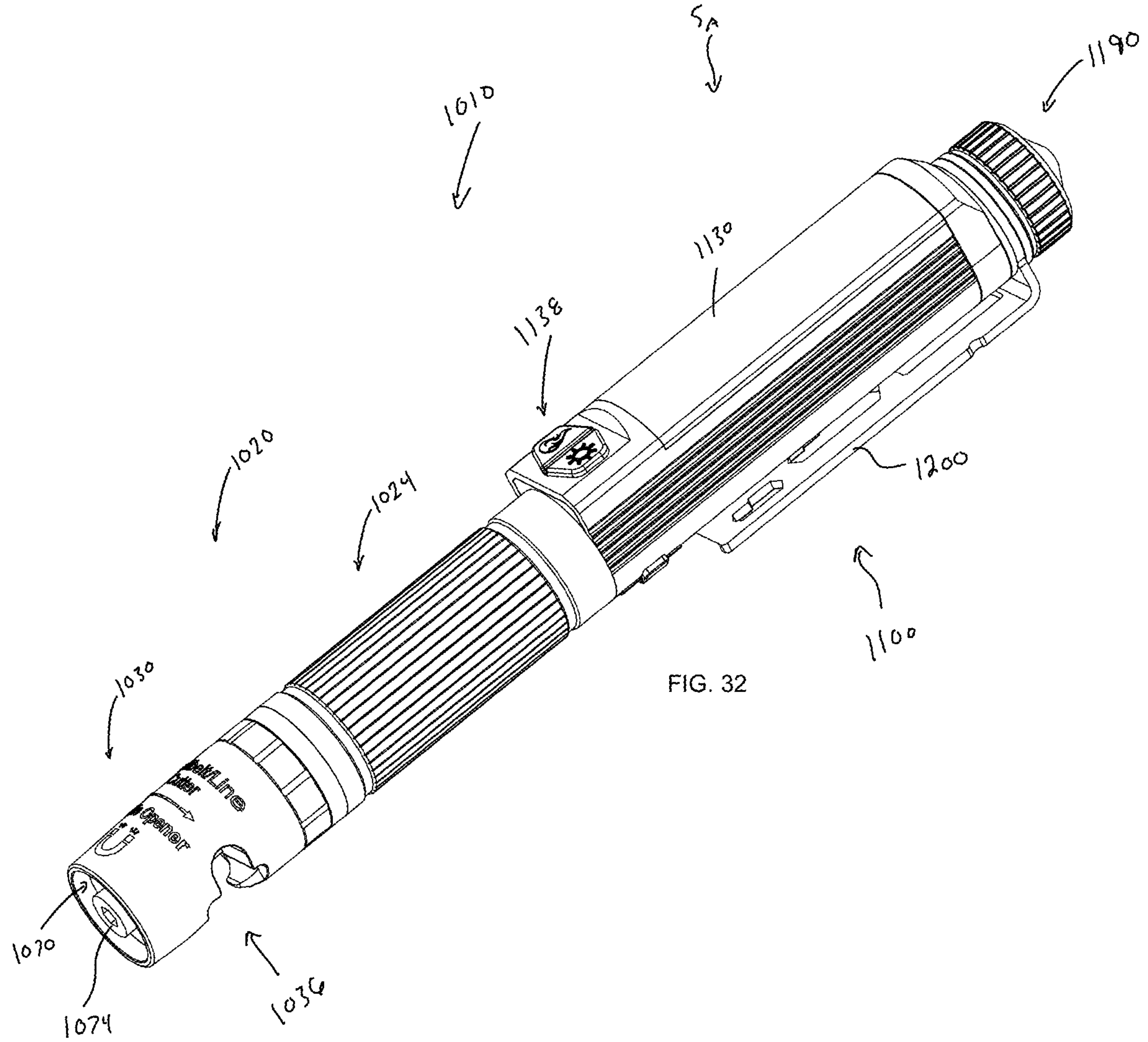
FIG. 32 is a perspective view of a flashlight according to a second exemplary embodiment.
Figure 33:
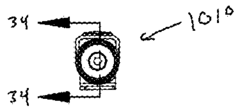
FIG. 33 is a bottom view of the flashlight of FIG. 32.
Figure 34:
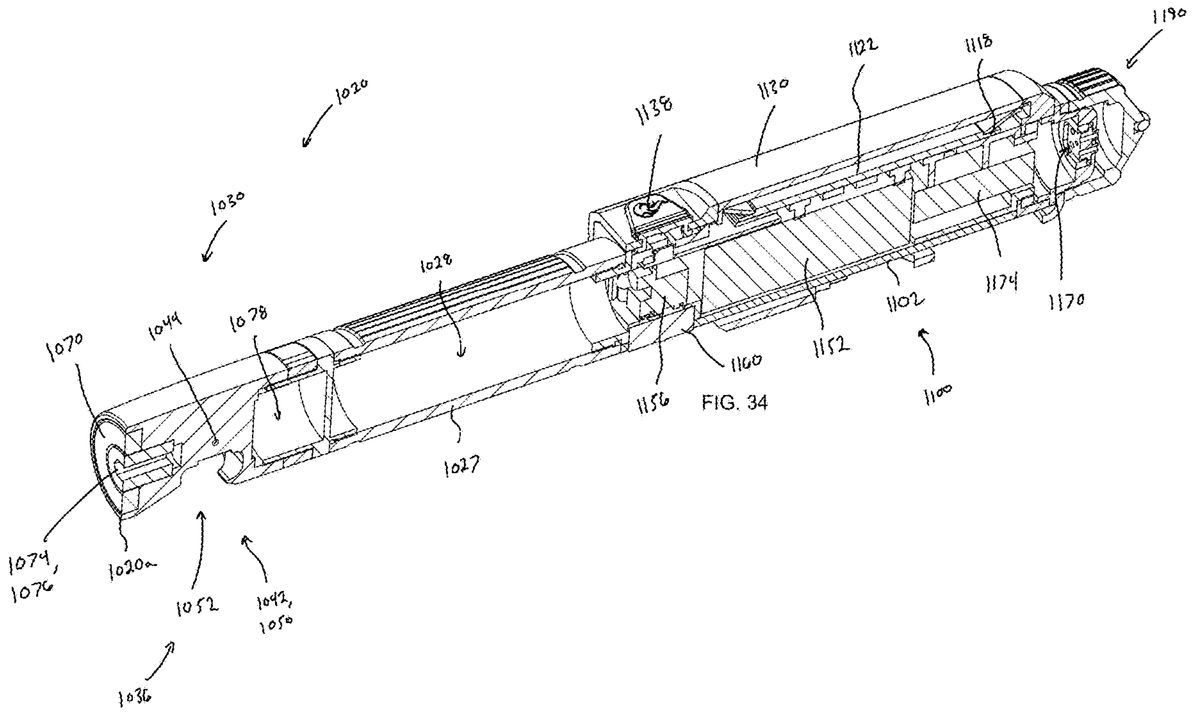
FIG. 34 is a cross-sectional view of the flashlight taken along line 34-34 of FIG. 33.
Figure 35:
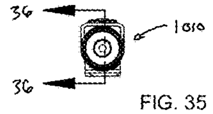
FIG. 35 is a bottom view of the flashlight of FIG. 32.
Figure 36:
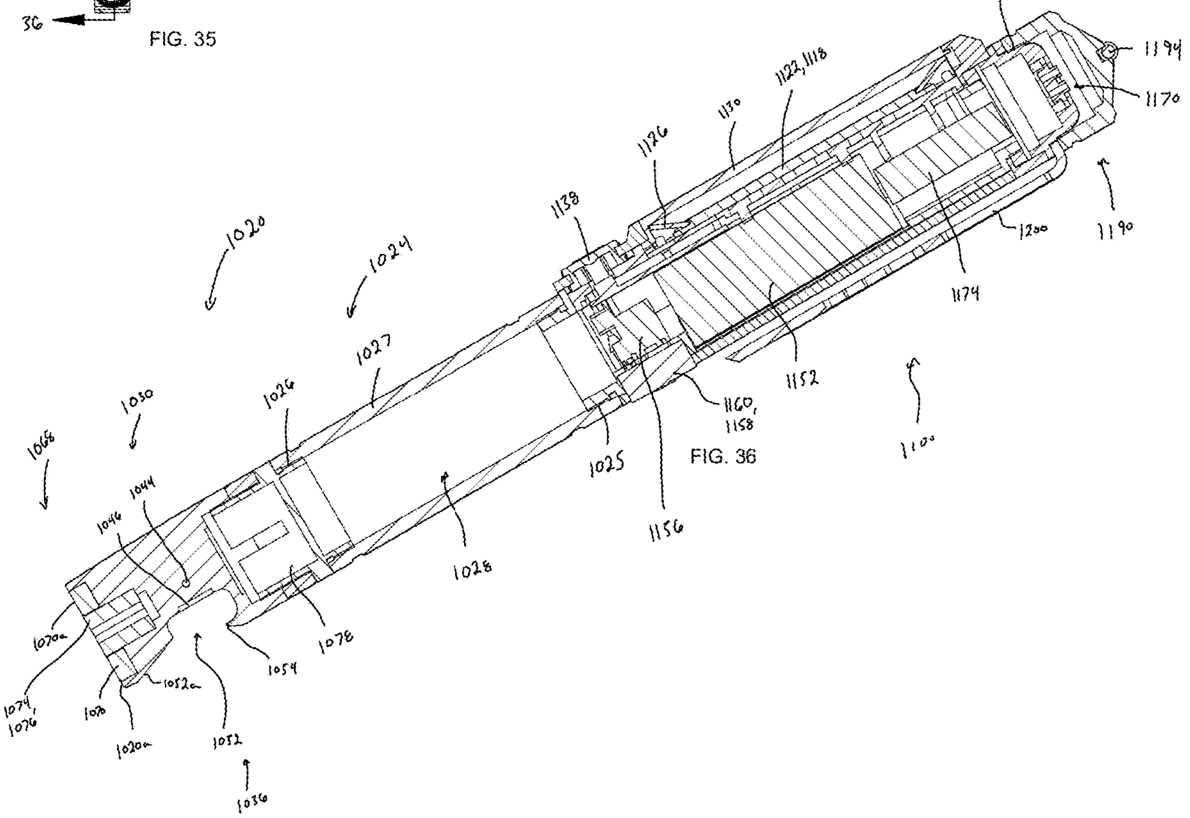
FIG. 36 is a cross-sectional view of the flashlight taken along line 36-36 of FIG. 35.

The main body assembly 100 is coupled to the handle assembly 20 and includes: (i) the lighting assembly 116, (ii) controller assembly 136, (iii) power assembly 150, and (iv) lighter assembly 170. Additionally, the main body assembly 100 in configured to house all of the electronic components of the multi-purpose flashlight 10. As such, the main body assembly 100 includes a housing assembly 102. Specifically, as best shown in FIG. 31, the housing assembly 102 includes an inner housing 106 and an outer housing 112. The outer housing 112 includes an assembly of side walls 113 that form: (i) a U-shaped receiver 114, and (ii) a button mounting structure 115. The U-shaped structure 114 interacts with the lens 130 and the combination of these two structures fully encircles all of the electronic components contained within the main body assembly 100. The U-shaped structure 114 includes a plurality of ribs that run longitudinally along the structure. 114. Additionally, the rear wall of the U-shaped structure is not flat, but instead it is curvilinear. However, in other embodiments, the rear wall may be flat or concave. The button mounting structure 115 is designed to position the button 138 below the lens 130, but in a location that is accessible to the user. However, in other embodiments, the button mounting structure 115 and accordingly the button 138 may be positioned in the handle assembly 20 (e.g., top portion 24 or bottom portion 30) or may be omitted and the flashlight may be operatically controlled via voice, heat, touch, or any other known method).

The inner housing 106 is configured to be received within the outer housing 112 and helps position electronic components within the main body assembly 100. Overall, the inner housing 106 may have a configuration and/or may be formed from a material that provides shock resistant capabilities to the flashlight 10. For example, the inner housing 106 may include polymeric material (e.g., energy absorbing plastic) that may deform upon an impact, while the outer housing 112 provides rigidity and may not deform upon an impact. It also should be understood that the inner housing 106 and the outer housing may be formed as an integrally formed single structure.

Referring to FIG. 31, the lighting assembly 116 includes the lens 130, a lighting element printed circuit board ("PCB") 118, an emitter assembly 122, and the reflector 126. The lens 130 is positioned adjacent to the reflector 126 and is coupled to the outer housing 112. This configuration helps ensure that most of the light passes through the lens 130. An extent of the cross-sectional shape of the lens 130 may be: (i) substantially rectangular, (ii) convex, or (iii) concave. This cross-sectional shape may be chosen based on the desired light distribution pattern and the type of emitter assembly 122. As described in detail below, the lens 130 may act as a first or primary optic in some embodiments of the flashlight 10 and may act as a second or additional optic in other embodiments of the flashlight 10.

The emitter assembly 122 is positioned adjacent to the lighting element PCB 118 and rearward from the lens 130. The emitter assembly 122 is composed of between 1 and 100 individual emitters 123, preferably between 10 and 50 individual emitters 123, and most preferably between 15 and 30 individual emitters 123. Every individual emitter 123, which is a part of the emitter assembly 122, is configured to illuminate when power is applied to the emitter assembly 122 by the lighting element PCB 118. The emitter assembly 122 may produce between 0 and 4000 lumens, preferably between 0 and 2000, and most preferably between 0 and 1000. It should be understood that in other embodiments every individual emitter 123 contained within the emitter assembly 122 may not be configured to illuminate when power is applied to the emitter assembly 122. For example, a user may be able to select the desired individual emitters 123 that the user wants illuminated, while keeping other individual emitters 123 unilluminated, which can vary the brightness of the emitted light and save battery power.

The emitter assembly 122 may be a Chip on Board ("COB") LED or surface-mount device LED. If the emitter assembly 122 is a COB LED, then the emitter assembly 122 contains multiple individual light emitters 123. Each of these individual light emitters 123 is covered by the lens 130, which acts as a first or primary optic. In this configuration, there is no secondary optic, as the individual light emitters 123 do not have individual optics. In other embodiments, a secondary optic may be included within the flashlight 10. For example, if a standard LED is selected as the emitter, the flashlight 10 may have a secondary optic. In this configuration, the primary optic for the standard LED is the optic that surrounds the LED, while the secondary optic is the lens 130. This secondary optic may be configured to protect the standard LEDs from the surrounding environment and protect the user from contacting the hot outer surface of the primary optics after the LEDs. In other embodiments, the lens 130 may also be omitted. In this configuration, there is no primary optic and no secondary optic. It should be understood that different types of emitter assemblies 122 may be utilized, such as: (i) a standard LED, (ii) organic LED, (iii) induction light panel, (iv) silicon quantum dot phosphor (SiQD-phosphor), or (v) surface-mount device LED. In addition, different color emitters 123 (e.g., red, green, blue) or a combination of different color emitters may be contained within the emitter assembly 122.

The flashlight 10 includes a reflector 126 that is positioned rearward of the lens 130 and surrounds the emitter assembly 122. The bottom 128 of the reflector 126 has a hole 130 therethrough that is configured to receive the emitter assembly 122. This reflector 126 helps focus the emitted light from the emitter assembly 122 in a specific direction to achieve the desired light distribution and pattern. It should be understood that the reflector 126 may be configured to dynamically alter the shape (e.g., broader or narrower light beam) of the light that is emitted from the emitter assembly 122. It should also be understood that the reflector 126 may be omitted.

The controller assembly 136 includes an illumination button 138 and a control board 142. The controller assembly 136 enables the user to alter the operational mode of the flashlight 10. This is accomplished by the user: (i) depressing the illumination button 138 one time to turn "On" the lighting assembly 116, (ii) depressing the illumination button 138 two times to turn "Off" the lighting assembly 116, or (iii) depressing the illumination button 138 three times to place the lighting assembly 116 in an SOS or flashing mode. Alternatively, the user may press and hold down the illumination button 138 during which time the flashlight 10 will change the operation mode after the user has held the button 138 down for a predetermined amount of time. If the user continues to hold down the button, the flashlight 10 will cycle through all operational modes of the flashlight 10. In alternative embodiments, the illumination button 138 may be replaced with an assembly that is configured to utilize one or more buttons, switches, sliders, sensors physically coupled to the flashlight 10 (e.g., motion, light, sound, or heat), sensors physically positioned at a distance from the flashlight 10 (e.g., cell phone, laptop, RF remote control, remote devices described in U.S. patent application Ser. No. 15/812,852, and which is fully incorporated herein by reference, or other devices that are connected to the portable flashlight 10 via the internet). Further, the flashlight 10 may include an assembly that includes a combination of elements that control the operation of the emitter 123.

The controller assembly 136 also includes a lighter button 139, which is coupled to the control board 142. The controller assembly 136 also enables the user to alter the operational mode of the lighter assembly 170. This is accomplished by the user depressing and hold down the lighter button 139, which in turn will cause the lighter assembly 170 to ignite. Once the user stops holding down the lighter button 139, the lighter assembly 170 will stop igniting. Similar to the above description in connection with the illumination button 138, the lighter button 139 may be replaced with an assembly that is configured to utilize one or more buttons, switches, sliders, sensors physically coupled to the flashlight 10 (e.g., motion, light, sound, or heat), sensors physically positioned at a distance from the flashlight 10 (e.g., cell phone, laptop, RF remote control, remote devices described in U.S. patent application Ser. No. 15/812,852, and which is fully incorporated herein by reference, or other devices that are connected to the portable flashlight 10 via the internet). Further, the flashlight 10 may include an assembly that includes a combination of elements that control the operation of the lighter assembly 170.

The power supply assembly 150 includes a power supply 152, a power controller 156, and a power receptacle concealer 160. Unlike most conventions flashlights, the power supply assembly 150 is positioned within the main body assembly 100 and is not positioned within the handle assembly 20. This unique location of the power supply assembly 150 allows the flashlight 10 to have a substantial internal compartment 28 without the power supply interfering with the formation of said compartment 28. Because the space in the main body assembly 100 is limited, the power supply 152 is a high-energy density, non-removable rechargeable battery. To charge this power supply 152, the user connects an external power source (e.g., a 110 volt wall outlet) to the power controller 156. In particular, the user connects an external power source (e.g., a 110 volt wall outlet) to a charging receptacle 158 of the power controller 156. Here, the charging receptacle 158 may be based on the USB standard (e.g., type A, type B, type C, mini A, mini B, micro A, micro B, etc.), a lighting standard, a standard male jack DC plug. Specifically, utilization of a USB type C charging receptacle 158 may be desirable because in certain configuration power can flow into the flashlight 10 to charge the power supply 152 and in other configurations power can flow out of the flashlight 10 and into a power consuming device (e.g., user's phone). Once the user connects an external power source (e.g., a 110 volt wall outlet) to a charging receptacle 158, current can then flow from the external power source (e.g., a 100 volt wall outlet) to the power controller 156 and finally to the battery 152. Once the battery 152 is charged, the external power source can be disconnected from the charging receptacle 158 and the charging receptacle 158 can be concealed within the main body assembly 100 by the power receptacle concealer 160. The power receptacle concealer 160 helps the flashlight become waterproof (e.g., ip67 or ip68). It should be understood that in other embodiments, the power receptacle concealer 160 may be omitted or the flashlight 10 may not be waterproof.

In other embodiments, the location of the power supply 152 may be changed (e.g., relocated into the handle assembly 20) and the power supply 152 may be: (i) a removable non-rechargeable battery, (ii) a removable rechargeable battery, (iii) a plurality of removable non-rechargeable batteries, (iv) a plurality of removable rechargeable batteries, (v) a plurality of non-removable rechargeable batteries, (vi) a combination of removable non-rechargeable batteries disposed within a battery cartridge, (vii) a combination of removable rechargeable batteries disposed within a battery cartridge, (viii) a DC power supply that is configured to connect to a 12 volt car battery, (ix) a DC power supply that is configured to connect to a 110 volt outlet, or (x) any other type of power supply that is known to a person of skill in the art. The non-rechargeable batteries may be any size battery, including A, B, C, D, AA, AAA, AAAA or custom designed batteries.

The lighter assembly 170 includes: contacts 172 and circuits 174. The circuits 174 may include: a CCFL inverter, capacitor(s), mosfet(s), diode(s), resistor(s), and inductor(s). This circuity 174 receives electrical current from the power supply 152 and is configured to create an arc between the contacts 172. As such, the lighter assembly 170 may be referred to as an electrical arc lighter, plasma lighter or a flameless lighter. It should be understood that in other embodiments, the lighter assembly 170 may be omitted or positioned in a different location (e.g., bottom portion 24).

The cap 190 includes a cap coupling means 192 that removably couples the cap 190 to the main body assembly 100. Removably coupling these structures allows the user to gain access to the lighter assembly 170. To accomplish the removable coupling of these structures, the cap coupling means 192 may be threaded projections, bayonet style, a pin and socket, and/or a quarter-turn. The cap 190 may also include a glass-breaker 194. Specifically, the glass-breaker 194 is a circular ball attached to the uppermost end of cap 190. This circular ball can act as a glass-breaker 194 because it centers the force applied by the user on the flashlight into a single area. It should be understood that in other embodiments, the cap 190 or the glass-breaker 194 may be omitted or positioned in a different location (e.g., bottom portion 24).

Referring to at least FIGS. 5-10, the attachment mechanism 200 forms a clip 202 with an upper end and a lower end that is biased towards an outer wall of the main body 100 to form a narrow gap there between. This gap allows an extent of the clip 202 to be received by a support member (e.g., within a pocket of the user) during use and/or non-use of the flashlight 10. The attachment mechanism 200 includes: (i) a clip attachment means 204, (ii) a can opener 230, (iii) a saw blade 250, (iv) at least one hex wrench 270 and preferably a plurality of wrenches 270(*a*), 270(*b*), and/or (v) a straight edge 275 with ruler segments opposite the saw 250. The clip attachment means 204 can be a ring 205 formed at the upper end where an upper end segment of the main body 100 is received by the attachment means 204. The removable cap 190 mates with and removably secures the attachment mechanism 200 to the main body 100 in a stored position $P_{ST}$ such that the attachment mechanism 200 (i) resides adjacent to an outer wall of the main body 100 and (ii) is aligned parallel with a longitudinal axis of the main body 100. After the removable cap 190 is detached, the attachment mechanism 200 can be removed from the main body 100, rotated 180 degrees with reference to the stored position $P_{ST}$, and then reconnected to the main body 100 by inserting the ring 250 over the upper end segment of the main body 100 and securing the cap 190 thereto to define an extended position $P_E$. In the extended position $P_E$, the attachment mechanism 200 (i) is axially aligned with the longitudinal axis of the main body 100 and (ii) extends outward and upward from the cap 190, such that the overall length of the flashlight 10 is increased by the axially extending attachment mechanism 200. Also in the extended position $P_E$, the attachment mechanism 200 is outwardly deployed such that the user has access to and can selectively utilize (i) the can opener 230, (ii) the saw 250, and/or (iii) the hex wrench 270 to perform desired tasks while using the main body 100 and handle assembly 20 of the flashlight 10 as a lever to increase the force applied by the user while performing these tasks. Alternatively, the bottom portion 30 of the handle assembly 20 is removably detached thereby exposing a lower end segment that is received by the ring 250 and then securing the bottom portion 30 to define a lower extended position $P_{LE}$. In the lower extended position $P_{LE}$, the attachment mechanism 200 (i) is axially aligned with the longitudinal axis of the handle assembly 20 and (ii) extends outward and downward from the bottom portion 30, such that the overall length of the flashlight 10 is increased by the axially extending attachment mechanism 200. In the lower extended position $P_{LE}$, the user can similarly utilize (i) the can opener 230, (ii) the saw 250, and/or (iii) the hex wrench 270 to perform desired tasks. A cover (not shown) can be removably connected to the attachment mechanism 200 to shield and protect (i) the can opener 230, (ii) the saw 250, and/or (iii) the hex wrench 270. It should be understood that in other embodiments, the attachment mechanism 200 or the can opener 230, the saw 250, and/or hex wrench 270 may be omitted.

Similar to the flashlight 10 as described above, FIGS. 32-36 show a second embodiment of a flashlight 1010. The flashlight 1010 can be selectively mounted in a various ways, has multiple illumination states, and includes a number of accessories. For sake of brevity, the above disclosure in connection with flashlight 1010 will not be repeated below, but it should be understood that across embodiments like numbers represent like structures. For example, the disclosure relating to lighting assembly 100 applies in equal force to lighting assembly 1100. Further, it should be understood that the operational modes of the flashlight 1010 are similar to, or identical to, those disclosed regarding flashlight 10. The primary difference between the first embodiment of the flashlight 10 and this second embodiment of the flashlight 1010 is that the knife 90 is omitted from the flashlight 1010. Omitting the knife 90, allows a user to utilize the internal compartment 28 as a storage compartment that is contained within the flashlight 10. Within this internal compartment 28, the user may store additional bits or other items.

In another embodiment, the flashlight 10 may include an emergency position indicating radio beacon (e.g., EPIRB, SART, or AIS-SART). The radio beacon may operate at these MHz frequency and may aid search and rescue operations, such as COSPAS-SARSAT, in finding the user. In an even further embodiment, the flashlight 10 may include a speaker and a wireless module (e.g., a module that is compatible with Bluetooth, NFC, Felica, WiFi, Zigbee, RFID, cellular, WiMAX, ISM, or any combination of these technologies) to enable a user to play music from the flashlight 10. In another embodiment, the flashlight 10 may include an ultraviolet light that is designed to attract and kill bugs. Other embodiments or combinations of the above embodiments are contemplated by this disclosure.

The flashlight 10 enables numerous benefits over prior lighting systems. Unlike a lighting system, the present disclosure provides for a system that synergistically and advantageously combines accessories that are useful for the user in a compact and portable configuration. While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Other implementations are also contemplated. While some implementations have been illustrated and described, numerous modifications come to mind without significantly departing from the spirit of the disclosure; and the scope of protection is only limited by the scope of the accompanying claims. For example, the overall shape of the flashlight 10 may be altered to be any one of the following shapes a triangular prism, a rectangular prism, a cube, a pentagonal prism, a hexagonal prism, octagonal prism, sphere, a cone, a tetrahedron, a cuboid, a dodecahedron, a icosahedron, a torus, a octahedron, a ellipsoid, or any other similar shape.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases. Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A multi-purpose flashlight, comprising:

a handle assembly including a cutting and opening assembly, a magnetic attachment means, and a bit attachment means;

a main body assembly including a lighter assembly and a lighting assembly, wherein the operational mode of the lighter assembly and the lighting assembly is controlled by a controller assembly; and a removable cap including a glass-breaker, the removable cap being configured to removably enclose the lighter assembly.

2. The multi-purpose flashlight of claim 1, further including an attachment mechanism that is removably coupled to the main body assembly;

wherein in a first position, the attachment mechanism is coupled to a support object in a first location; and wherein in a second position, (i) the flashlight is disconnected from the support object and brought by a user to a second location distant from the first location and (ii) the lighting element provides illumination to the second location.

3. The multi-purpose flashlight of claim 1, wherein the cutting and opening assembly includes a blade and a beverage opener that has a protrusion.

4. The multi-purpose flashlight of claim 3, wherein the blade resides inward of the beverage opener.

5. The multi-purpose flashlight of claim 3, wherein the blade resides inward of the protrusion of the beverage opener.

6. The multi-purpose flashlight of claim 1, wherein the magnetic attachment means is positioned substantially flush with the lowermost surface of the flashlight and has a recess.

7. The multi-purpose flashlight of claim 6, wherein the recess of the magnetic attachment means is configured to receive an extent of the bit attachment means.

8. The multi-purpose flashlight of claim 1, wherein the lighter assembly is a plasma lighter.

9. The multi-purpose flashlight of claim 1, wherein the handle assembly includes a top portion and a bottom portion, wherein the bottom portion includes a knife blade extending therefrom.

10. The multi-purpose flashlight of claim 9, wherein the top portion includes a receiver that is configured to receive the knife blade when the flashlight is an assembled state ($S_A$).

11. The multi-purpose flashlight of claim 10, when the flashlight is in the assembled state ($S_A$), the knife is concealed within an outer wall arrangement of the top portion.

12. The multi-purpose flashlight of claim 2, wherein the attachment mechanism is removably connected to the main body and is deployed from the main body in an extended position.

13. The multi-purpose flashlight of claim 12, wherein the attachment mechanism includes an attachment ring and at least one of a can opener, a saw blade, a hex wrench and a straight edge.

14. The multi-purpose flashlight of claim 13, wherein in the extended position, the attachment mechanism is outwardly deployed such that the user has access to and can selectively utilize the can opener, the saw, and/or the hex wrench to perform desired tasks while using the main body and handle assembly of the flashlight as a lever to increase the force applied by the user while performing these tasks.

* * * * *